US008514428B2

(12) United States Patent
Fukuda

(10) Patent No.: US 8,514,428 B2
(45) Date of Patent: Aug. 20, 2013

(54) PRINTING APPARATUS FOR PROCESSING DOCUMENT APPLICATION DATA WHEN DIRECT-PRINT IS PERMITTED OR TEMPORARILY PERMITTED, CONTROL METHOD THEREOF, AND COMPUTER PROGRAM

(75) Inventor: Shin Fukuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1536 days.

(21) Appl. No.: 11/762,225

(22) Filed: Jun. 13, 2007

(65) Prior Publication Data

US 2007/0291296 A1 Dec. 20, 2007

(30) Foreign Application Priority Data

Jun. 19, 2006 (JP) ................. 2006-169386

(51) Int. Cl.
 *G06F 3/12* (2006.01)
(52) U.S. Cl.
 USPC ....................................................... 358/1.15
(58) Field of Classification Search
 USPC ......................................... 358/1.1, 1.15, 1.18
 See application file for complete search history.

(56) References Cited

U.S. PATENT DOCUMENTS

2002/0196468 A1 12/2002 Klassen et al.
2004/0032619 A1 2/2004 Izki
2004/0263891 A1* 12/2004 Yamada et al. .............. 358/1.13
2005/0088701 A1 4/2005 Uchida et al.
2005/0133608 A1 6/2005 Baiera
2005/0253886 A1 11/2005 Nakajima et al.

FOREIGN PATENT DOCUMENTS

| JP | 2001-296990 A | 10/2001 |
| JP | 2003-223435 A | 8/2003 |
| JP | 2005-027065 | 1/2005 |
| JP | 2005-309882 A | 11/2005 |

OTHER PUBLICATIONS

The above references were cited in a Oct. 27, 201 US Office Action that issued in related U.S. Appl. No. 11/762,209.
U. S. References were cited in a Apr. 1, 2010 U.S. Office Action, that issued in a related U.S. Appl. No. 11/762,209.
The above reference was cited in a Oct. 21, 2011 Japanese Office Action, without English Translation, that issued in Japanese Patent Application No. 2006-169386.
The above references were cited in a Jul. 22, 2011 Japanese Office Action, without English Translation, that issued in Japanese Patent Application No. 2006-169386.

* cited by examiner

*Primary Examiner* — Jeremiah Bryar
(74) *Attorney, Agent, or Firm* — Cowan, Liebowitz & Latman, P.C.

(57) ABSTRACT

Application data is extracted based on a read document image. A license for a function of printing the application data is permitted in accordance with a license key based on the read document image. After permission, the extracted application data is printed.

4 Claims, 20 Drawing Sheets

F I G. 13
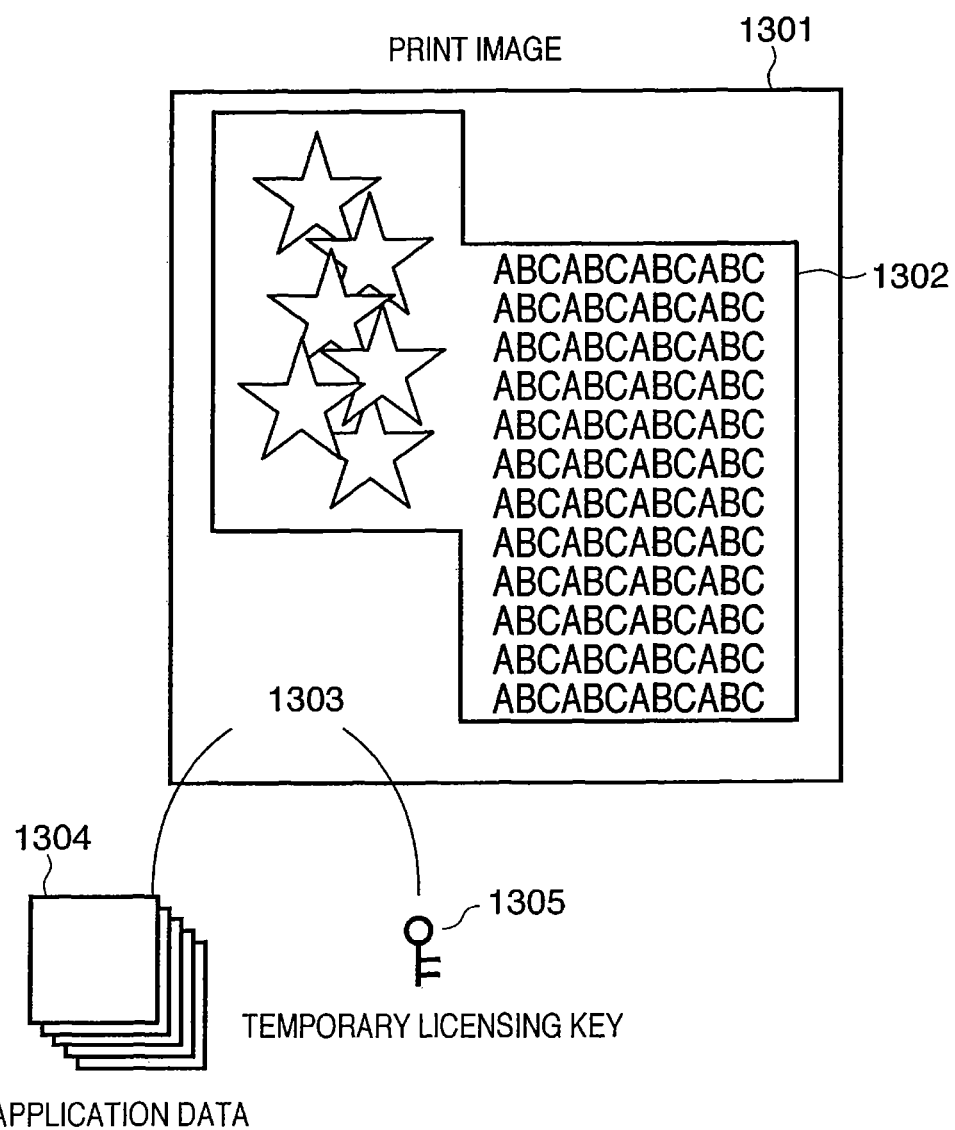

PRINT ERROR

TEMPORARY LICENSING KEY IS INVALID

PLEASE RETRY USING PRINTING SHEET
TO WHICH TEMPORARY LICENSING IS
CORRECTLY SET

PRINTING APPARATUS FOR PROCESSING DOCUMENT APPLICATION DATA WHEN DIRECT-PRINT IS PERMITTED OR TEMPORARILY PERMITTED, CONTROL METHOD THEREOF, AND COMPUTER PROGRAM

BACKGROUND OF THE INVENTION

1. Field of the Invention

The present invention relates to a printing system configured by connecting via a network an information processing apparatus which generates a print job to be output to a printing apparatus and a printing apparatus which prints based on a print job.

2. Description of the Related Art

In a conventional printing apparatus, a printer driver in a host apparatus such as a host computer generates print data corresponding to a printing apparatus from application data, and the printing apparatus receives and prints that print data. Also, one recent printing apparatus is capable of directly interpreting application data by the apparatus itself and directly printing (to be referred to as direct print hereinafter) the interpreted data.

On the other hand, a technique of printing invisible or visible digital information on a printing sheet is available. This technique converts digital information into a dot pattern in accordance with a certain rule and prints the dot pattern as an ink image on a printing sheet by a printing apparatus. The dot pattern forms information by using dot intervals and the like. The dot pattern is often printed using ink with a light-color component such as yellow so as to make the dot pattern serve as invisible information. When an object is present near the dot pattern, the color of the dot pattern is determined based on this object.

With this process, secret information or voluminous information can be embedded on a paper sheet and extracted later.

In an environment wherein the aforementioned direct print is used, generally, license management is done to control the use of direct print. For example, Japanese Patent Laid-Open No. 2005-27065 discloses the arrangement of such license management. More specifically, in a copying machine including a scanner unit and printer unit, authentication is performed when the use of software which is an optional function stored in a ROM is to be permitted. When the authentication is successful, the use of the function which is on the copying machine and implemented by the software is permitted.

However, since application data printed on a printing sheet cannot be directly printed in general, application data needs to be converted once into print data by using a printer driver on a host computer.

Note that when application data has a form which can be direct-printed by the printing apparatus, it is possible to print that data without using a host computer.

Direct print is generally a license-managed optional function, and a user often needs to purchase a license to validate the function. Such arrangement is preferable for administrators from the viewpoint of preventing unauthorized use, however, a complicated procedure such as license purchase is required for users in addition to routine operation.

SUMMARY OF THE INVENTION

The present invention has been made to solve the above-described problem, and has as its object to provide a printing apparatus, control method thereof, and a computer program which can flexibly permit the use of a function of an apparatus in an environment wherein the use of the function of the apparatus is restricted by license management.

According to one aspect of the present invention, a printing apparatus comprising:

reading means for reading a document image;

extraction means for extracting, based on a document image read by the reading means, application data included in the document image and generated by an application running on an information processing apparatus;

permission means for permitting a license for a function of printing application data in accordance with a license key based on a document image read by the reading means; and printing means for printing application data extracted by the extraction means after permission by the permission means.

In a preferred embodiment, the apparatus further comprises invalidating means for invalidating a license for a function of printing the application data after printing by the printing means.

According to another aspect of the present invention, a control method for printing apparatus comprising steps of:

reading a document image;

extracting, based on a document image read in the reading step, application data included in the document image and generated by an application running on an information processing apparatus;

permitting a license for a function of printing application data in accordance with a license key based on a document image read in the reading step; and printing application data extracted in the extraction step after permission in the permission step.

According to still another aspect of the present invention, a computer program, stored in a computer-readable medium, causing a computer to execute the steps of:

extracting, based on a document image read by a reading unit, application data included in the document image and generated by an application running on an information processing apparatus;

permitting a license for a function of printing application data in accordance with a license key based on a document image read in the reading step; and printing application data extracted in the extraction step after permission in the permission step.

Further features of the present invention will be apparent from the following description of exemplary embodiments with reference to the attached drawings.

BRIEF DESCRIPTION OF THE DRAWINGS

FIG. 13 is a view showing the printing sheet on which application data output from the printing system of the second embodiment of the present invention is printed;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
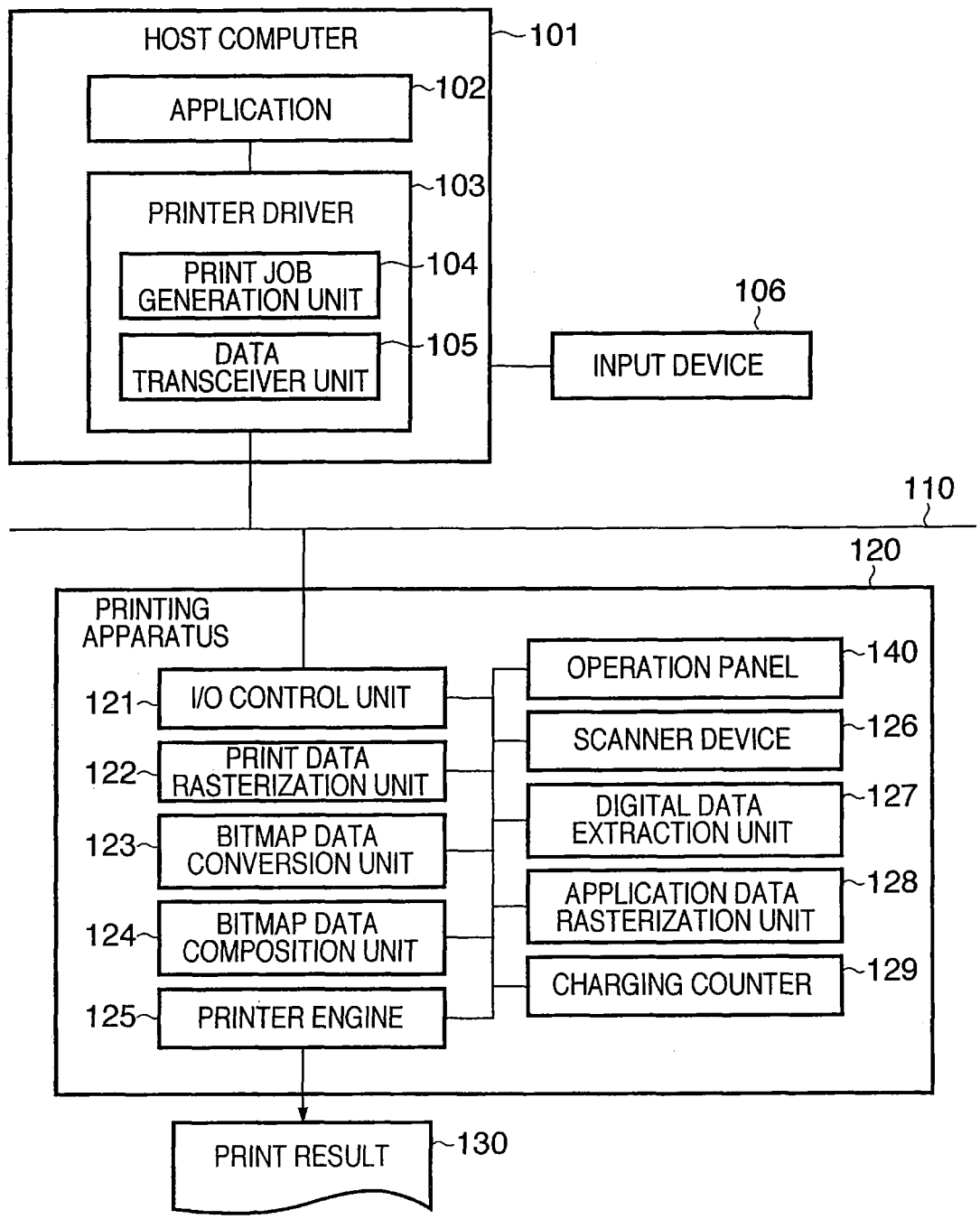
FIG. 1 is a block diagram showing the schematic configuration of a printing system of the first embodiment of the present invention.

<Description of FIG. 1>

FIG. 1 is a block diagram showing the schematic configuration of a printing system of the first embodiment of the present invention.

As shown in FIG. 1, a printing system of the first embodiment is configured by a host computer 101 and printing apparatus 120. The host computer 101 and printing apparatus 120 are connected to each other via, e.g., a communication line 110 such as a LAN.

The host computer 101 comprises an application 102 and printer driver 103. The application 102 obtains user's input information from an input device (e.g., keyboard and pointing device (mouse and the like)) and generates document data to be printed. The printer driver 103 generates a print job to be transmitted to the printing apparatus 120 from the document data generated by the application 102.

The printer driver 103 includes a print job generation unit 104 and data transceiver unit 105. The print job generation unit 104 receives from the application 102 information to be printed and generates a print job including print data, attribute information thereof, and the like. The data transceiver unit 105 transmits/receives, e.g., various types of data including a print job to/from an external device.

The printing apparatus 120 comprises an I/O control unit 121 which controls communication with an external network and a print data rasterization unit 122 which rasterizes print data included in a received print job into printable bitmap data. The printing apparatus 120 also comprises a bitmap data conversion unit 123 which converts digital data (encrypted information) such as application data included in a print job into bitmap data. The printing apparatus 120 comprises a bitmap data composition unit 124 which can superimpose some bitmap data and composite them.

The bitmap data conversion unit 123 converts application data into bitmap data which indicates digital data (encrypted information) rasterizable by an application data rasterization unit 128. Application data is generated by an application such as a document generation application or image generation application running on the host computer 101. An example of such data is a PDF file generated by Acrobat available from Adobe Systems Incorporated.

The printing apparatus 120 also comprises a printer engine 125 which physically prints bitmap data on a printing sheet and a scanner device 126 which reads an image printed on a printing sheet as bitmap data. The printing apparatus 120 comprises a digital data extraction unit 127 which extracts recorded digital data (encrypted information) from read bitmap data. The printing apparatus 120 comprises the application data rasterization unit 128 which directly interprets extracted digital data and rasterizes it into bitmap data. The printing apparatus 120 further comprises a charging counter 129 which counts up charge in accordance with execution (e.g., print count) of various print jobs.

An operation panel 140 includes an input unit such as a touch panel having a display unit and operation unit, various physical buttons and keys, and the like. This operation panel is used to input an execution instruction of various processes, setting, status display, and the like to the printing apparatus 120. Reference numeral 130 denotes a printed print result.

As a printing method for the printer engine 125, various types of printing methods, e.g., a laser beam method, inkjet method, thermal transfer method, and the like are available.

The host computer 101 comprises standard building components (e.g., CPU, RAM, ROM, hard disk, external storage device, network interface, display, keyboard, and mouse) of a general-purpose computer. When the CPU, RAM, and ROM operate in cooperation with each other, the CPU executes a program stored in the RAM or ROM, thereby implementing various kinds of processing executed on the host computer 101.

The printing apparatus 120 comprises a CPU, RAM, and ROM for implementing various control processes of, e.g., print operation. When the CPU, RAM, and ROM operate in cooperation with each other, the CPU executes a program stored in the RAM or ROM, thereby implementing various kinds of processing executed on the printing apparatus 120.

The communication line 110 is, typically, any one of the Internet, a LAN, WAN, telephone line, dedicated digital circuit, ATM, frame relay line, communication satellite channel, cable television line, data broadcasting radio channel, and the like. The communication line 110 can be a so-called communication network implemented by combining these lines described above and suffices as long as data can be transmitted/received.

A process sequence of a case wherein a user prints in the printing system having the above-described configuration will be described.

Figure 2:
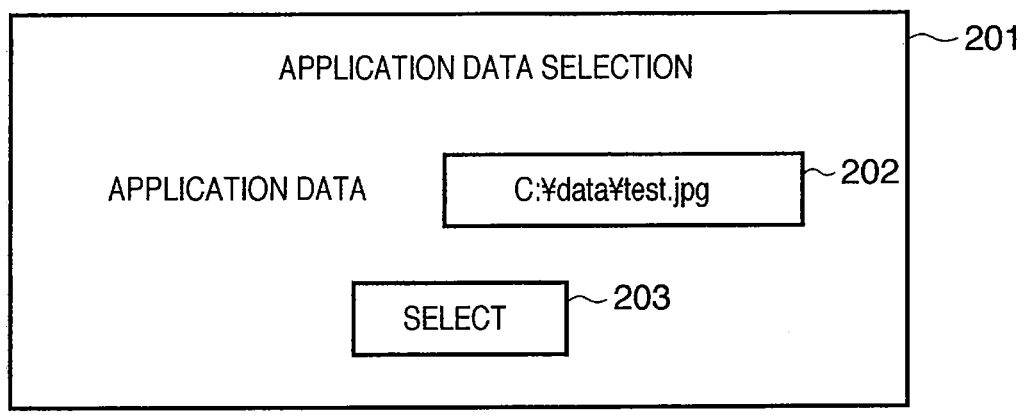
FIG. 2 is a view illustrating a dialog for selecting application data to be printed on a printing sheet by a user of the printing system of the first embodiment of the present invention.

<Description of FIG. 2>

FIG. 2 is a view illustrating a dialog for selecting application data to be printed on a printing sheet by a user of the printing system of the first embodiment of the present invention.

Reference numeral 201 denotes an application data selection dialog for selecting application data. The application data selection dialog 201 is generated by the printer driver 103 and displayed on a display on the host computer 101. When the user designates application data in a text box 202 via an input device 106 and presses a button 203, the printer driver 103 can be notified of the designated application data.

Figure 3:
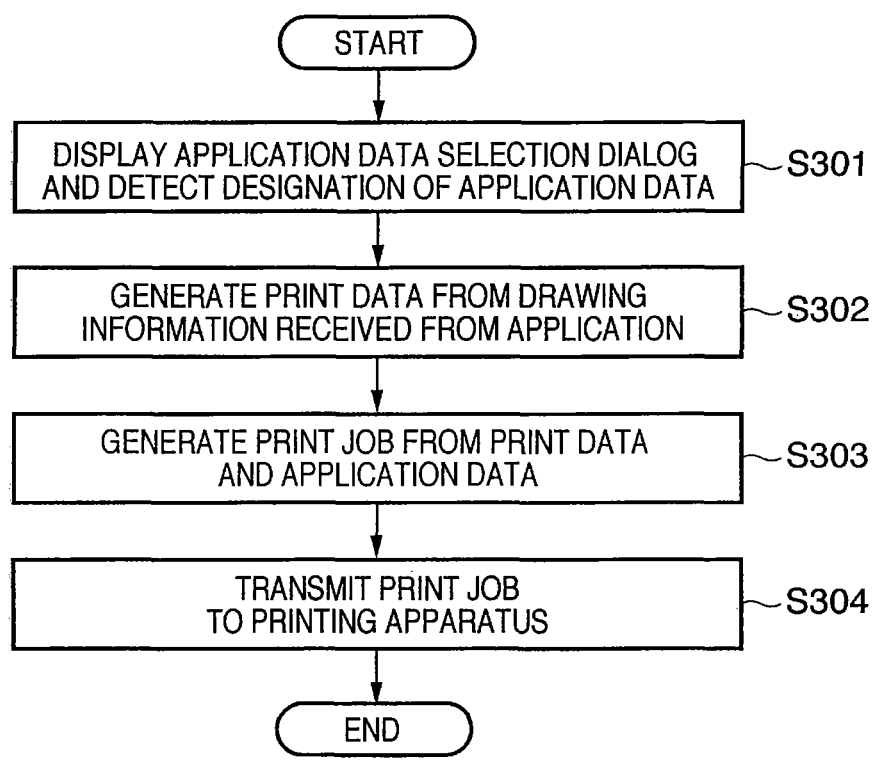
FIG. 3 is a flowchart illustrating the process executed by a host computer of the first embodiment of the present invention.

<Description of FIG. 3>

FIG. 3 is a flowchart illustrating the process executed by the host computer of the first embodiment of the present invention.

FIG. 3 illustrates the process of the printer driver 103 executed when the user obtains a print result with application data printed. The process of the printer driver 103 is implemented under the control of the CPU of the host computer 101.

The printer driver 103 displays the application data selection dialog 201 and detects user's designation of application data (step S301). After that, the application 102 receives drawing information and generates print data which can be printed by the printing apparatus 120 (step S302). The printer driver 103 generates a print job from the designated application data and generated print data (step S303). The printer driver 103 transmits the generated print job to the printing apparatus 120 (step S304).

Figure 4:
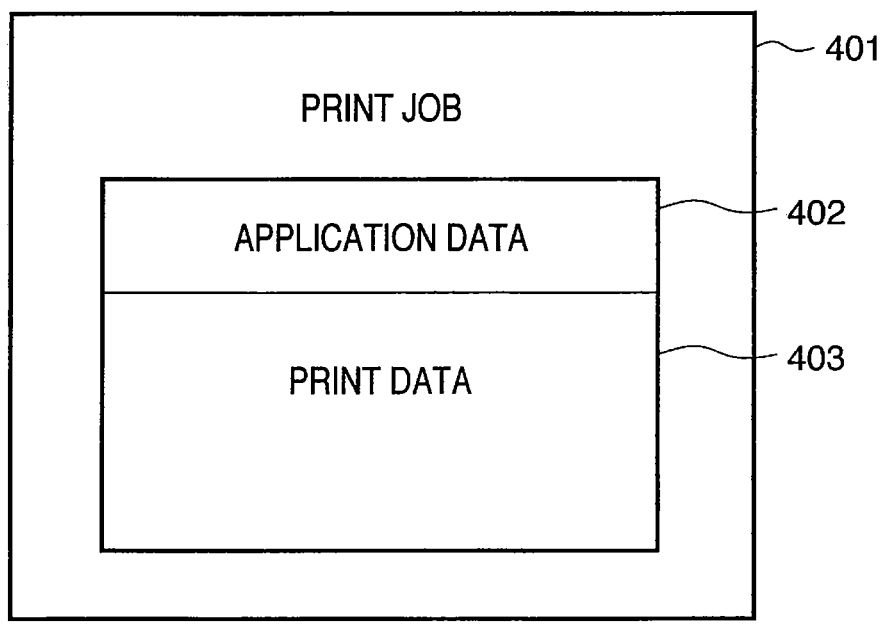
FIG. 4 is a view illustrating the form of a print job generated in step S304 of the first embodiment of the preset invention.

<Description of FIG. 4>

FIG. 4 is a view illustrating the form of the print job generated in step S304 of the first embodiment of the preset invention.

Reference numeral 401 denotes the whole print job. Reference numeral 402 denotes the application data selected by the user in step S301 of FIG. 3; and 403, the print data generated by the printer driver 103 in step S302 of FIG. 3. The print job 401 generally includes the application data 402 and print data 403. The print data 403 is described in, e.g., a page description language (to be referred to as PDL hereinafter).

Figure 5:
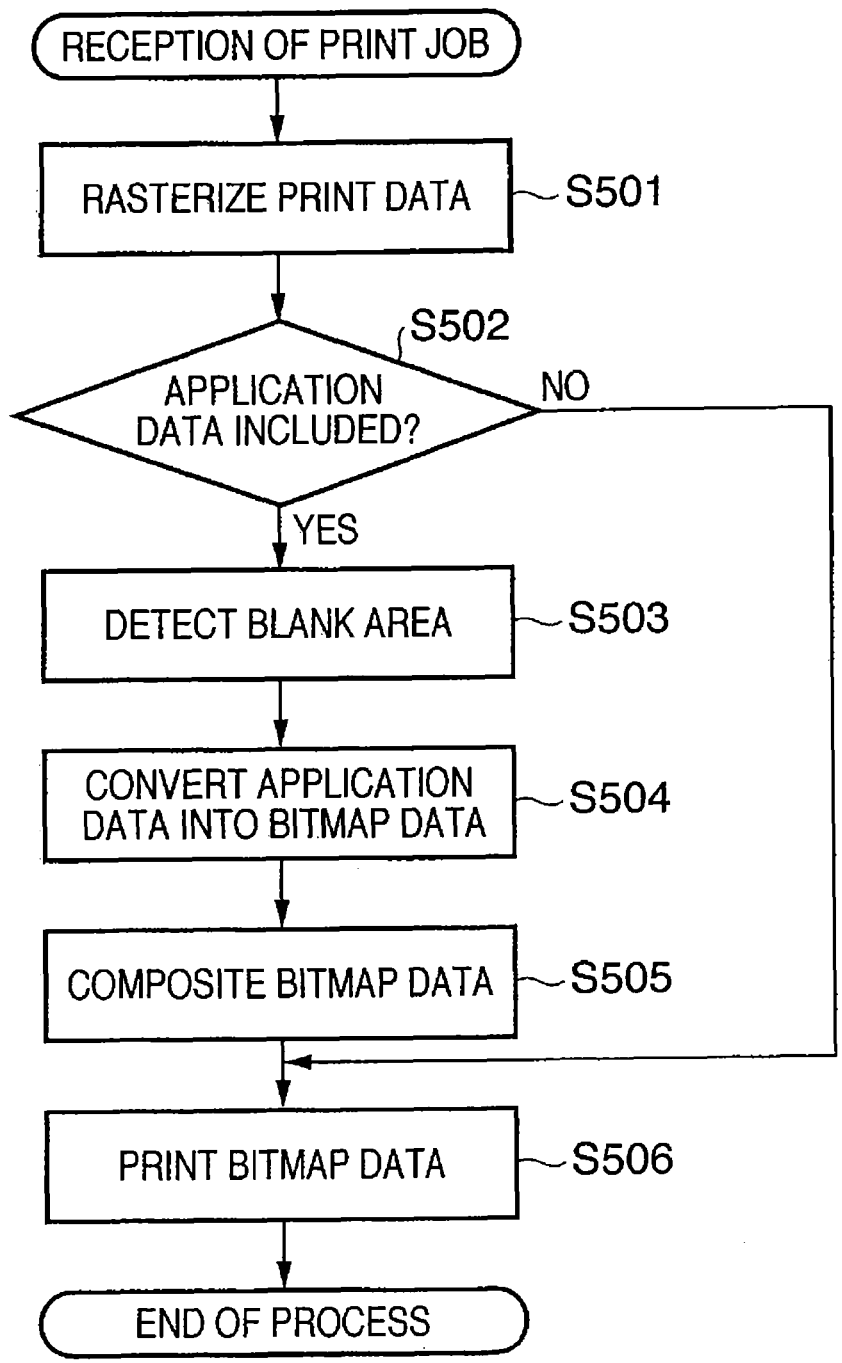
FIG. 5 is a flowchart illustrating the process executed by a printing apparatus of the first embodiment of the present invention.

<Description of FIG. 5>

FIG. 5 is a flowchart illustrating the process executed by the printing apparatus of the first embodiment of the present invention.

FIG. 5 illustrates the process executed when the printing apparatus 120 receives a print job from the host computer 101. The process of the printing apparatus 120 is implemented under the control of the CPU of the printing apparatus 120.

Upon receiving a print job, the printing apparatus 120 reads out print data included in the print job, and the print data rasterization unit 122 rasterizes the readout print data into bitmap data (step S501). The printing apparatus 120 determines whether the received print job includes application data (step S502).

When the print job includes no application data (NO is step S502), the printing apparatus 120 transmits the generated bitmap data to the printer engine 125 to execute printing (step S506). On the other hand, when the print job includes application data (YES in step S502), the printing apparatus 120 detects a blank area from the generated bitmap data (step S503).

The bitmap data conversion unit 123 converts the application data included in the print job into bitmap data in accordance with the shape of the detected blank area (step S504). The bitmap data composition unit composites the rasterized bitmap data and converted bitmap data to generate one bitmap data (step S505). After that, the printing apparatus 120 transmits the composited bitmap image to the printer engine 125 to execute printing (step S506).

Figure 6:
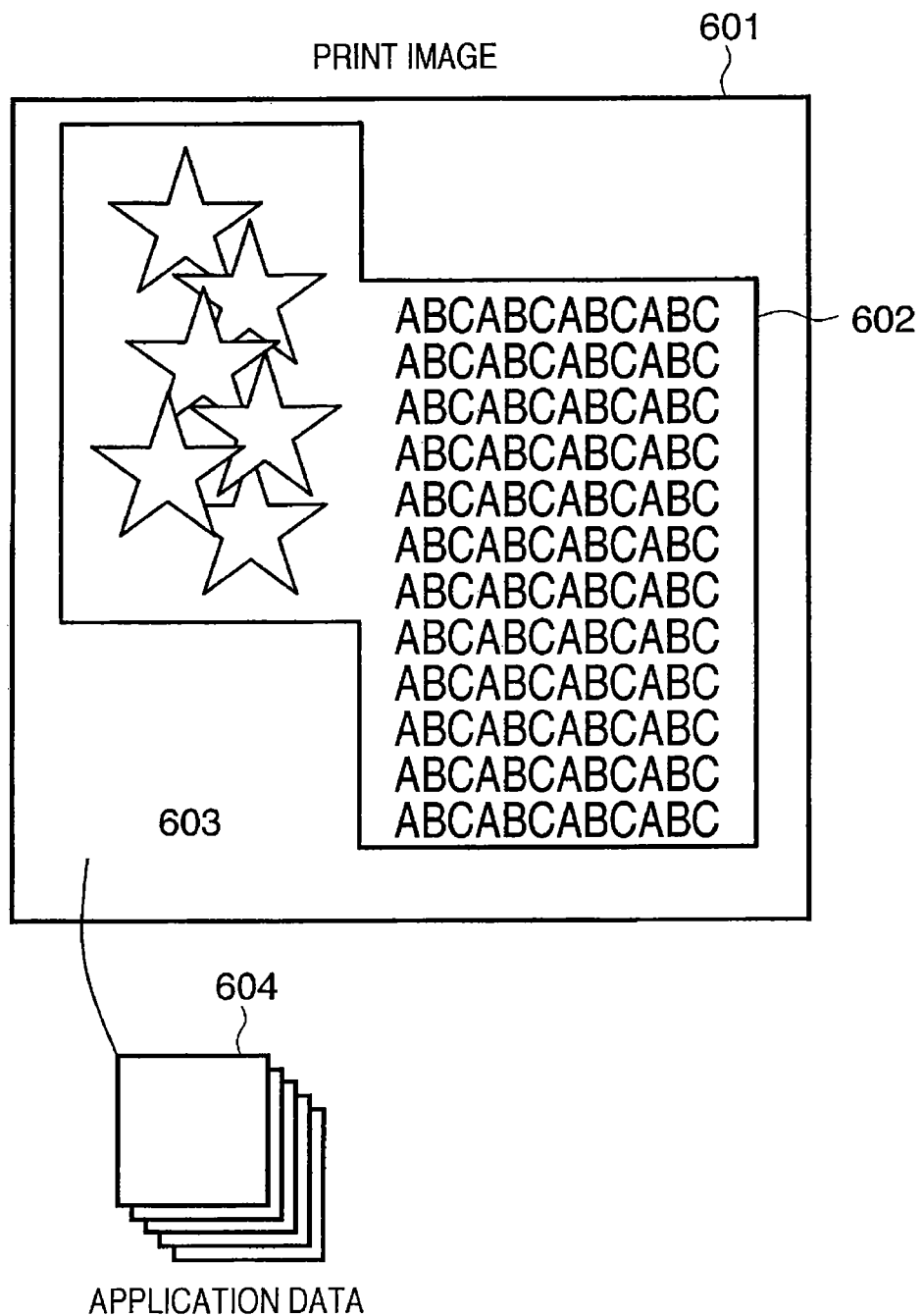
FIG. 6 is a view showing the printing sheet on which application data output from the printing system of the first embodiment of the present invention is printed.

<Description of FIG. 6>

FIG. 6 is a view showing the printing sheet on which application data output from the printing system of the first embodiment of the present invention is printed.

Reference numeral 601 denotes the whole printing sheet. Visible information 602 is printed on the printing sheet 601. Application data 604 is printed on a margin area (blank area) 603 as invisible information. Application data can be a plurality of page data, as denoted by reference numeral 604. In this embodiment, invisible information refers to, in a strict sense, information which is printed on a background image of a given color, in a color the same or approximate to the given color, and therefore cannot be visually identified by the human eye. Of course, application data may be printed as invisible information by embedding them not in the margin area but in the visible information 602.

Figure 7:
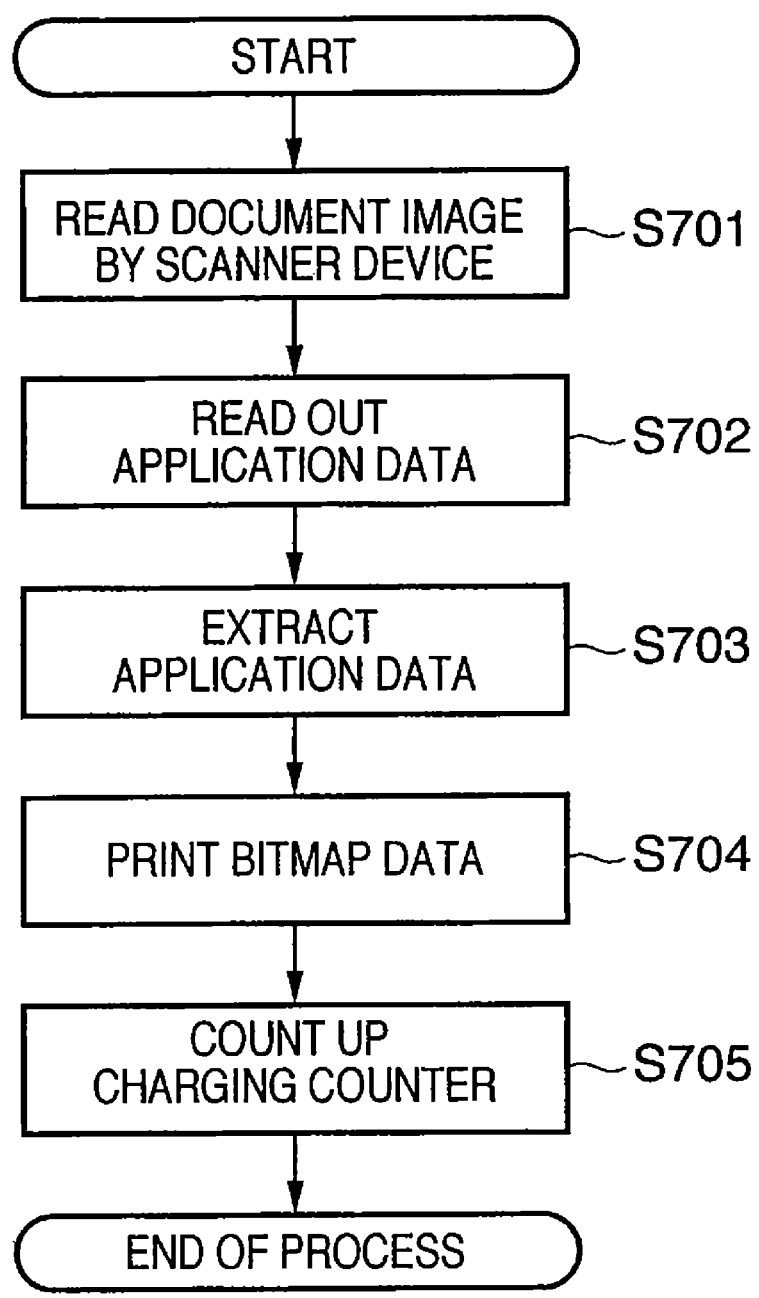
FIG. 7 is a flowchart illustrating the process executed by the printing apparatus of the first embodiment of the present invention.

<Description of FIG. 7>

FIG. 7 is a flowchart illustrating the process executed by the printing apparatus of the first embodiment of the present invention.

FIG. 7 illustrates the process of the printing apparatus 120 executed when a user uses a printing sheet with application data printed to print the application data. The process of the printing apparatus 120 is implemented under the control of the CPU of the printing apparatus 120.

First, the scanner device 126 reads image data printed on a document image (step S701). The digital data extraction unit 127 extracts application data from the read image data (step S702). The application data rasterization unit 128 directly interprets the extracted application data and rasterizes it into bitmap data (step S703). The printing apparatus 120 then transmits the rasterized bitmap data to the printer engine 125 to execute printing (step S704). After that, the printing apparatus 120 counts up the charging counter 129 (step S705), and a sequence of the printing process is ended.

As has been described above, according to the first embodiment, it becomes possible to print application data on a printing sheet and direct-prints application data from a printing sheet with the application data printed. In addition, charging in accordance with the use amount of direct print of an application becomes available.

Second Embodiment

In the second embodiment, a printing system will be described, which can direct-print application data from a printing sheet with the application data printed even when a direct print unit usable in a printing apparatus is license-managed. Note that in the second embodiment, only different parts from the first embodiment will be described, and the same components as in the first embodiment are denoted by the same reference numerals.

Figure 8:
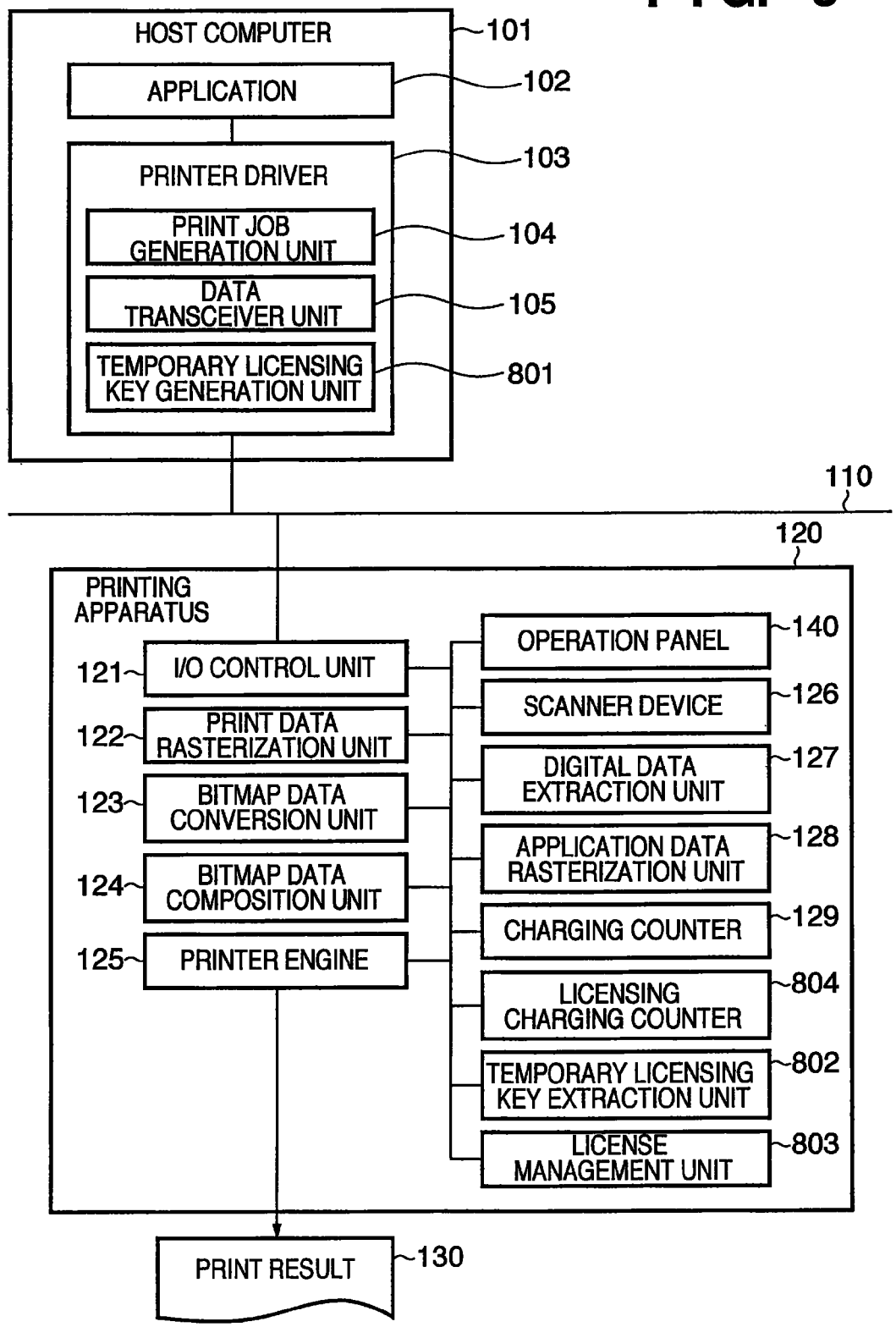
FIG. 8 is a block diagram showing the schematic configuration of a printing system of the second embodiment of the present invention.

<Description of FIG. 8>

FIG. 8 is a block diagram showing the schematic configuration of a printing system of the second embodiment of the present invention.

As shown in FIG. 8, the printing system of the second embodiment is configured by a host computer 101 and printing apparatus 102, as in the first embodiment.

In addition to the components of the first embodiment, a printer driver 103 includes a temporary licensing key generation unit 801 which generates a temporary licensing key (license information) corresponding to application data.

The printing apparatus 120 comprises a temporary licensing key extraction unit 802 for extracting a temporary licensing key printed on a printing sheet, and a license management unit 803 which executes license management for the respective functions included in the printing apparatus 120. The license management unit 803 manages, for example, information about presence/absence (permission/prohibition of direct print) of a license to direct-print the application data, for each application data. When the license is present, direct print is permitted.

The printing apparatus 120 comprises a licensing charging counter 804 used to charge for direct print of application data temporarily licensed by a temporary licensing key.

A process sequence of a case wherein a user prints in the printing system having the above-described configuration will be described.

Figure 9:
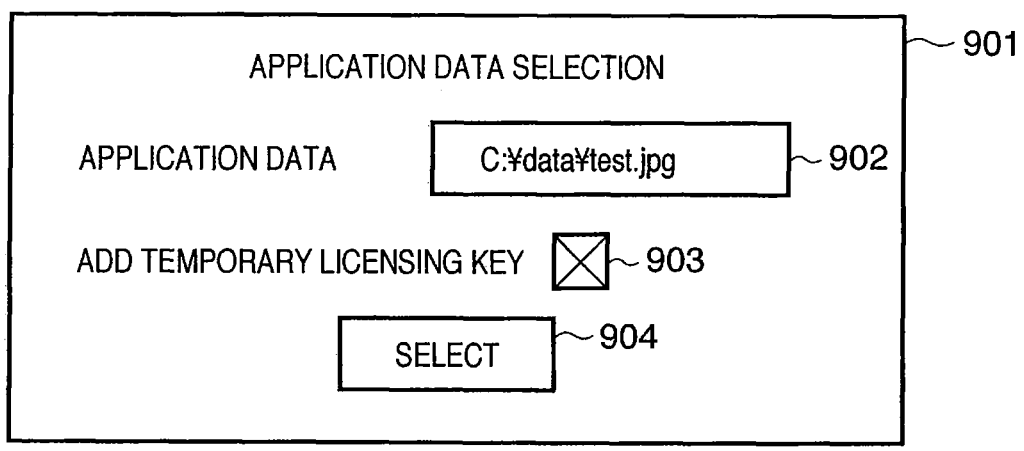
FIG. 9 is a view illustrating a dialog for selecting application data to be printed on a printing sheet by a user of the printing system of the second embodiment of the present invention.

<Description of FIG. 9>

FIG. 9 is a view illustrating a dialog for selecting application data to be printed on a printing sheet by a user of the printing system of the second embodiment of the present invention.

Reference numeral 901 denotes an application data selection dialog for selecting application data. The application data selection dialog 901 is generated by the printer driver 103 and displayed on a display on the host computer 101. A user can designate application data in a text box 902 via an input device 106.

Reference numeral 903 denotes a check box for selecting whether to add a temporary licensing key. With this check box 903, a temporary licensing key is added. With this arrangement, even a printing apparatus without a license to direct-print the application data designated in the text box 902 can direct-print the application data. After the above-described selection is made, the user presses a button 904, and the printer driver 103 can be notified of the application data.

Figure 10:
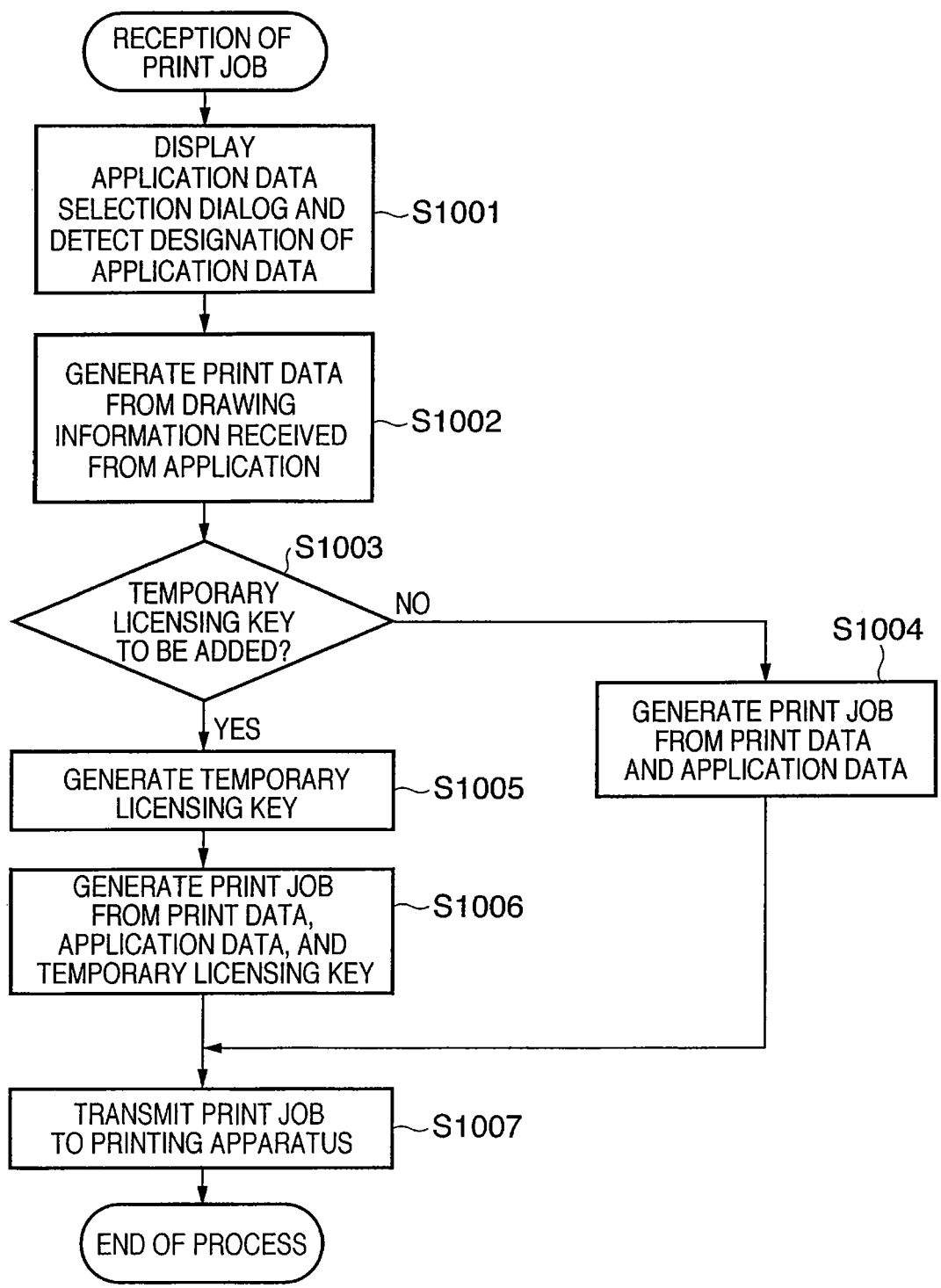
FIG. 10 is a flowchart illustrating the process executed by a host computer of the second embodiment of the present invention.

<Description of FIG. 10>

FIG. 10 is a flowchart illustrating the process executed by the host computer of the second embodiment of the present invention.

FIG. 10 illustrates the process of the printer driver 103 executed when the user obtains a print result with application data printed. The process of the printer driver 103 is implemented under the control of the CPU of the host computer 101.

The printer driver 103 displays the application data selection dialog 901 and detects user's designation of application data and presence/absence of a temporary licensing key (step S1001). After that, an application 102 receives drawing information and generates print data which can be printed by the printing apparatus 120 (step S1002).

The printer driver 103 determines whether designation to add a temporary licensing key is made (step S1003). When no designation to add a temporary licensing key is made (NO in step S1003), the printer driver 103 generates a print job from the designated application data and generated print data (step S1004). The printer driver 103 transmits the generated print job to the printing apparatus 120, and a sequence of the process is ended.

On the other hand, when the designation to add a temporary licensing key is made (YES in step S1003), the temporary licensing key generation unit 801 generates a temporary licensing key (step S1005). A temporary licensing key is generated by the printer driver 103 as digital data.

The printer driver 103 generates a print job from the designated application data, generated print data, and generated temporary licensing key (step S1006). After that, the printer driver 103 transmits the generated print job to the printing apparatus 120, and a sequence of the process is ended.

Figure 11:
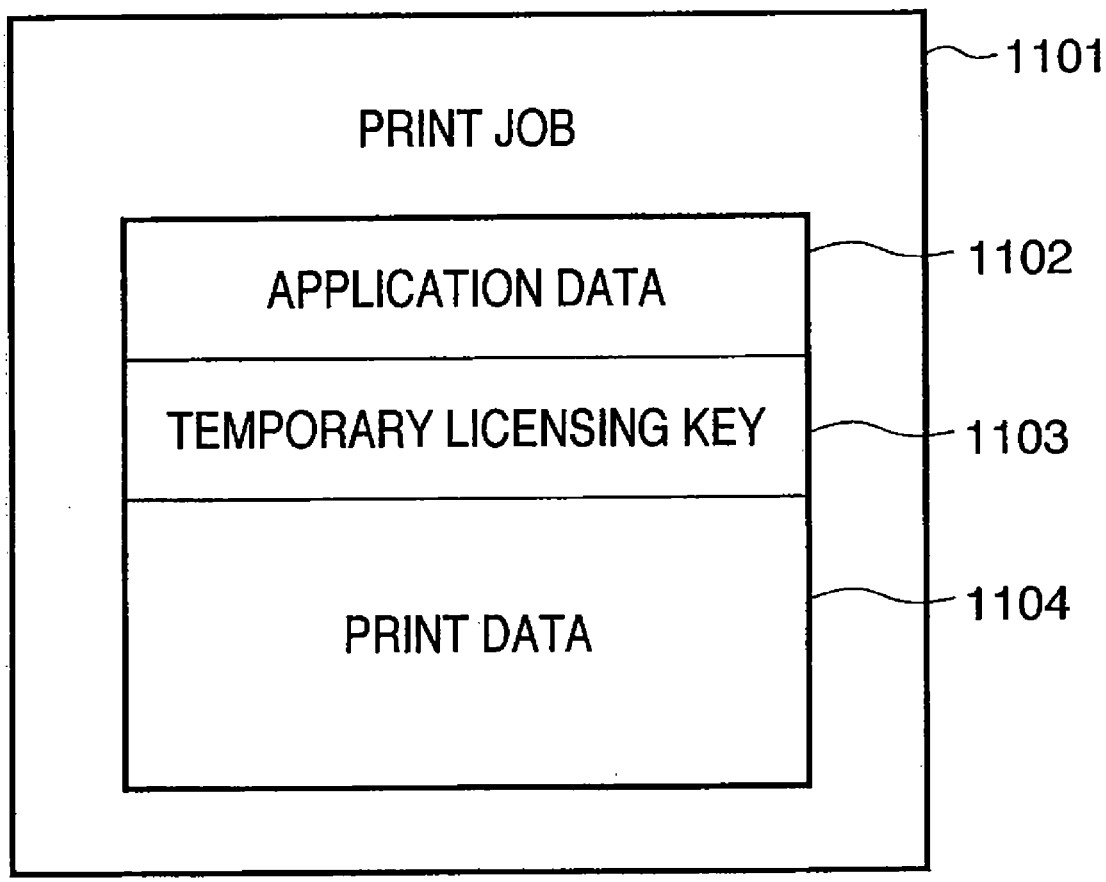
FIG. 11 is a view illustrating the form of a print job generated in step S1006 of the second embodiment of the preset invention.

<Description of FIG. 11>

FIG. 11 is a view illustrating the form of the print job generated in step S1006 of the second embodiment of the preset invention.

Reference numeral 1101 denotes the whole print job. Reference numeral 1102 denotes the application data selected by the user in step S1001 of FIG. 10; 1103, the temporary licensing key generated by the printer driver 103 in step S1005 of FIG. 10; and 1104, the print data generated by the printer driver 103 in step S1002 of FIG. 10. The print job 1101 is generally formed to include the application data 1102, temporary licensing key 1103, and print data 1104. The print data 1104 is described in, e.g., a page description language (to be referred to as PDL hereinafter).

Figure 12:
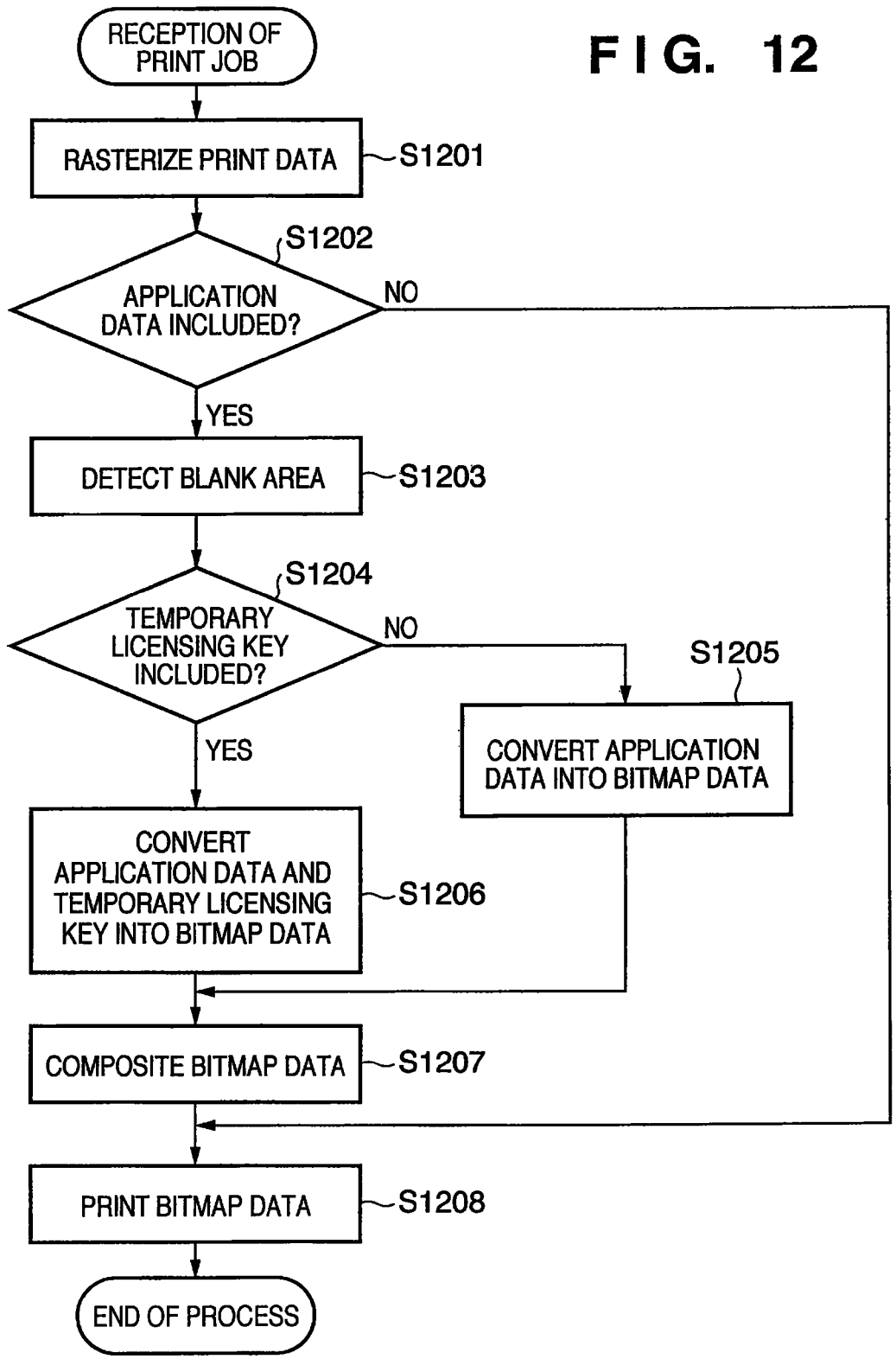
FIG. 12 is a flowchart illustrating the process executed by a printing apparatus of the second embodiment of the present invention.

<Description of FIG. 12>

FIG. 12 is a flowchart illustrating the process executed by the printing apparatus of the second embodiment of the present invention.

FIG. 12 illustrates the process executed when the printing apparatus 120 receives a print job from the host computer 101. The process of the printing apparatus 120 is implemented under the control of the CPU of the printing apparatus 120.

Upon receiving a print job, the printing apparatus 120 reads out print data included in the print job, and a print data rasterization unit 122 rasterizes the readout print data into bitmap data (step S1201). The printing apparatus 120 determines whether the received print job includes application data (step S1202).

When the print job includes no application data (NO is step S1202), the printing apparatus 120 transmits the generated bitmap data to a printer engine 125 to execute printing (step S1208). On the other hand, when the print job includes application data (YES in step S1202), the printing apparatus 120 detects a blank area from the generated bitmap data (step S1203).

Next, the printing apparatus 120 determines whether the received print job includes a temporary licensing key (step S1204). When no temporary licensing key is included (NO in step S1204), a bitmap data conversion unit 123 converts the application data into bitmap data in accordance with the shape of the detected blank area (step S1205).

On the other hand, when a temporary licensing key is included (YES in step S1204), the bitmap data conversion unit 123 converts the application data and temporary licensing key into bitmap data in accordance with the shape of the detected blank area (step S1206).

The bitmap data composition unit composites the rasterized bitmap data and the bitmap data converted in step S1205 or S1206 to generate one bitmap data (step S1207). After that, the printing apparatus 120 transmits the composited bitmap image to the printer engine 125 to execute printing (step S1208).

<Description of FIG. 13>

FIG. 13 is a view showing the printing sheet on which application data output from the printing system of the second embodiment of the present invention is printed.

Reference numeral 1301 denotes the whole printing sheet. Visible information 1302 is printed on the printing sheet 1301. Application data 1304 and temporary licensing key 1305 are printed on a margin area 1303 as invisible information. Application data can be a plurality of page data, as denoted by reference numeral 1304.

Figure 14:
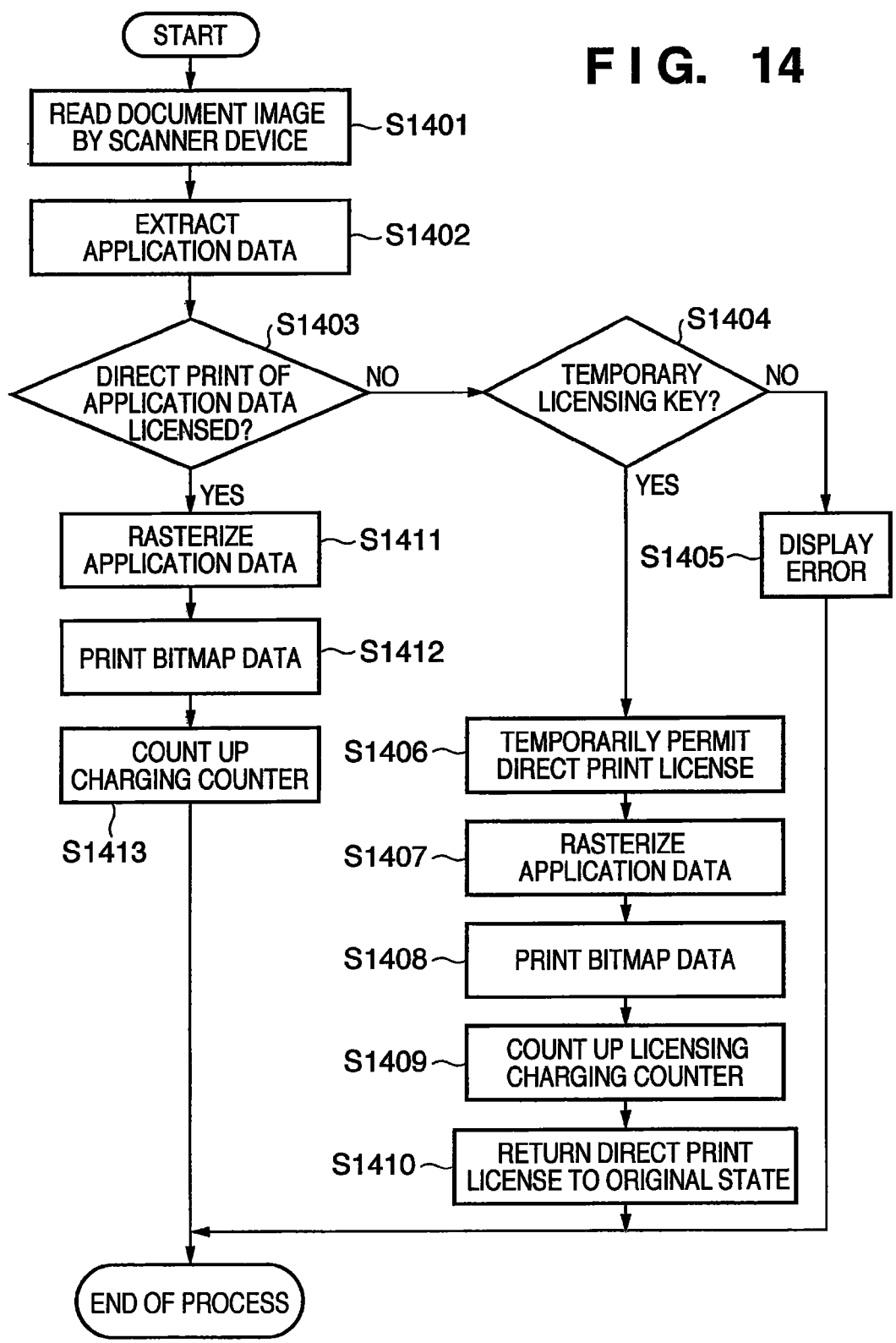
FIG. 14 is a flowchart illustrating the process executed by the printing apparatus of the second embodiment of the present invention.

<Description of FIG. 14>

FIG. 14 is a flowchart illustrating the process executed by the printing apparatus of the second embodiment of the present invention.

FIG. 14 illustrates the process of the printing apparatus 120 executed when a user uses a printing sheet with application data printed to print the application data.

First, a scanner device 126 reads image data printed on a document image (step S1401). A digital data extraction unit 127 extracts application data from the read image data (step S1402).

The license management unit 803 determines whether a license to direct-print the extracted application by the printing apparatus 120 is permitted (step S1403).

When the license for the direct print is not permitted (NO in step S1403), the temporary licensing key extraction unit 802 determines whether a temporary licensing key is recorded in the read image data (step S1404). When no temporary licensing key is recorded (NO in step S1404), an error notification window is displayed (step S1405) and a sequence of the process is ended.

On the other hand, when the temporary licensing key is recorded (YES in step S1404), the license management unit 803 temporarily permits the license to direct-print the application data (step S1406). An application data extraction unit 128 directly interprets the extracted application data and rasterizes it into bitmap data (step S1407).

The printing apparatus 120 transmits the rasterized bitmap data to the printer engine 125 to execute printing (step S1408). After that, the printing apparatus 120 counts up the licensing charging counter 804 (step S1409). The license management unit 803 returns the license which was temporarily permitted to the original state (prohibition of direct print) (step S1410), and a sequence of the printing process is ended.

On the other hand, when the license to direct-print the application data is permitted (YES in step S1403), the application data rasterization unit 128 directly interprets the extracted application data and rasterizes it into bitmap data (step S1411). The printing apparatus 120 then transmits the rasterized bitmap data to the printer engine 125 to execute printing (step S1412). After that, the printing apparatus 120 counts up a charging counter 129 (step S1413), and a sequence of the printing process is ended.

Figure 15:
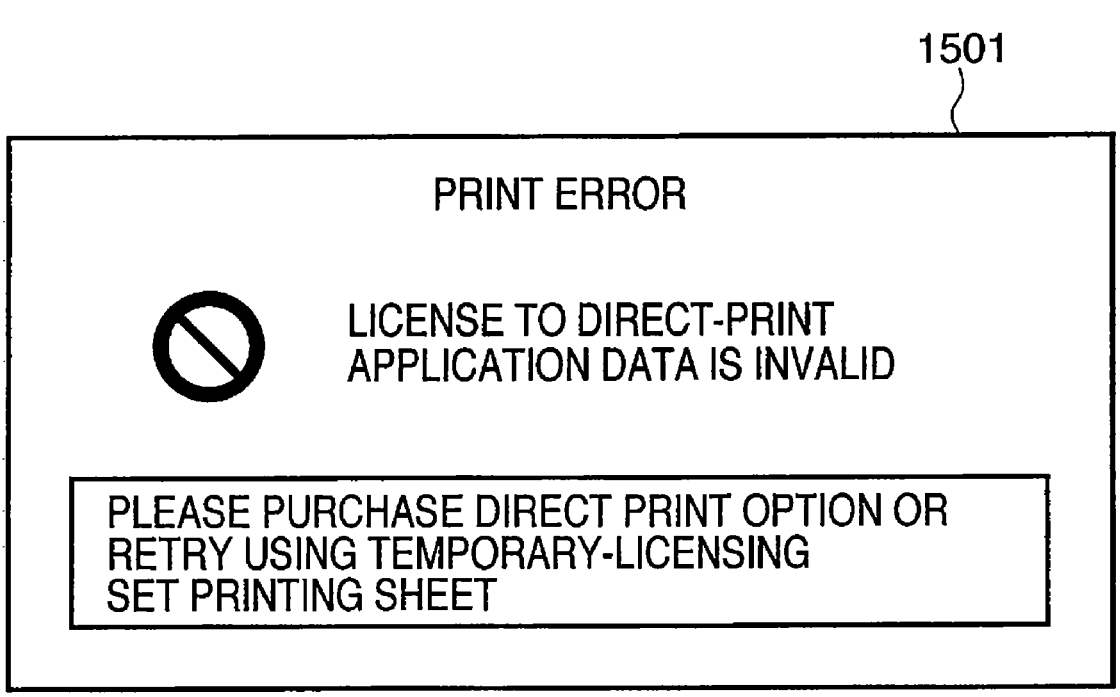
FIG. 15 is a view illustrating an example of an error notification window displayed in step S1405 of the second embodiment of the present invention.

<Description of FIG. 15>

FIG. 15 is a view illustrating an example of an error notification window displayed in step S1405 of the second embodiment of the present invention.

The error notification window is displayed on, e.g., an operation panel 140 included in the printing apparatus 120 or a screen of the host computer 101.

As has been described above, according to the second embodiment, it becomes possible, even in a printing apparatus in which the license to direct-print application data is invalid, to direct-print the application data from a printing sheet with the application data printed. In addition, charging in accordance with the use amount of direct print of an application becomes available.

Third Embodiment

In the second embodiment, the printing apparatus itself is charged upon printing using a temporary licensing key. To the contrary, in the third embodiment, a printing system will be described in which a user who instructs printing with a temporary licensing key is charged upon generating a printing sheet with the temporary licensing key added.

In the third embodiment, a printing system will also be described which becomes more secure by making a temporary licensing key correspond to application data. Note that in the third embodiment, only different parts from the second embodiment will be described, and the same components as in the second embodiment will be denoted by the same reference numerals.

Figure 16:
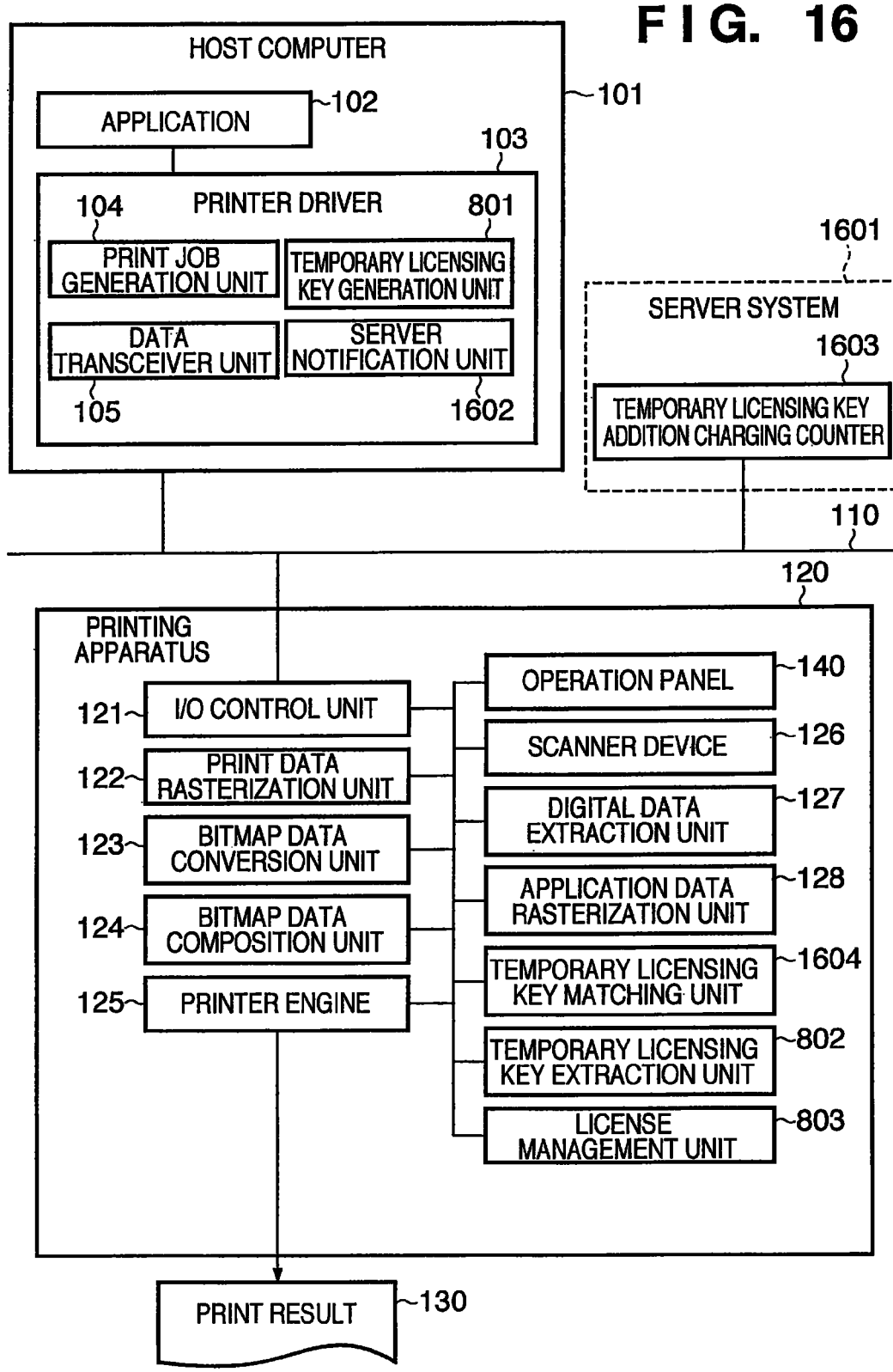
FIG. 16 is a block diagram showing the schematic configuration of a printing system of the third embodiment of the present invention.

<Description of FIG. 16>

FIG. 16 is a block diagram showing the schematic configuration of a printing system of the third embodiment of the present invention.

As shown in FIG. 16, the printing system of the third embodiment is configured by a host computer 101, printing apparatus 120, and server system 1601.

The server system 1601 comprises standard building components (e.g., CPU, RAM, ROM, hard disk, external storage device, network interface, display, keyboard, and mouse) of a general-purpose computer. When the CPU, RAM, and ROM operate in cooperation with each other, the CPU executes a program stored in the RAM or ROM, thereby implementing various kinds of processing executed on the server system 1601.

In addition to the components of the second embodiment, a printer driver 103 includes a server notification unit 1602 which notifies the server system 1601 that a temporary licensing key generation unit 801 generated a temporary licensing key.

The server system 1601 comprises a temporary licensing key addition charging counter 1603 which can charge in accordance with the amount of printing that adds temporary licensing keys to printing sheets.

The printing apparatus 120 comprises a temporary licensing key matching unit 1604 which checks matching of a temporary licensing key extracted by a temporary licensing key extraction unit 802 with application data printed on a printing sheet. The temporary licensing key matching unit 1604 determines the validity of a temporary licensing key.

A process sequence of a case wherein a user prints in the printing system having the above-described configuration will be described.

Note that an application data selection dialog for selecting application data to be printed on a printing sheet by a user of this printing system has the same arrangement (FIG. 9) as in the second embodiment, and a description thereof will not be repeated.

Figure 17:
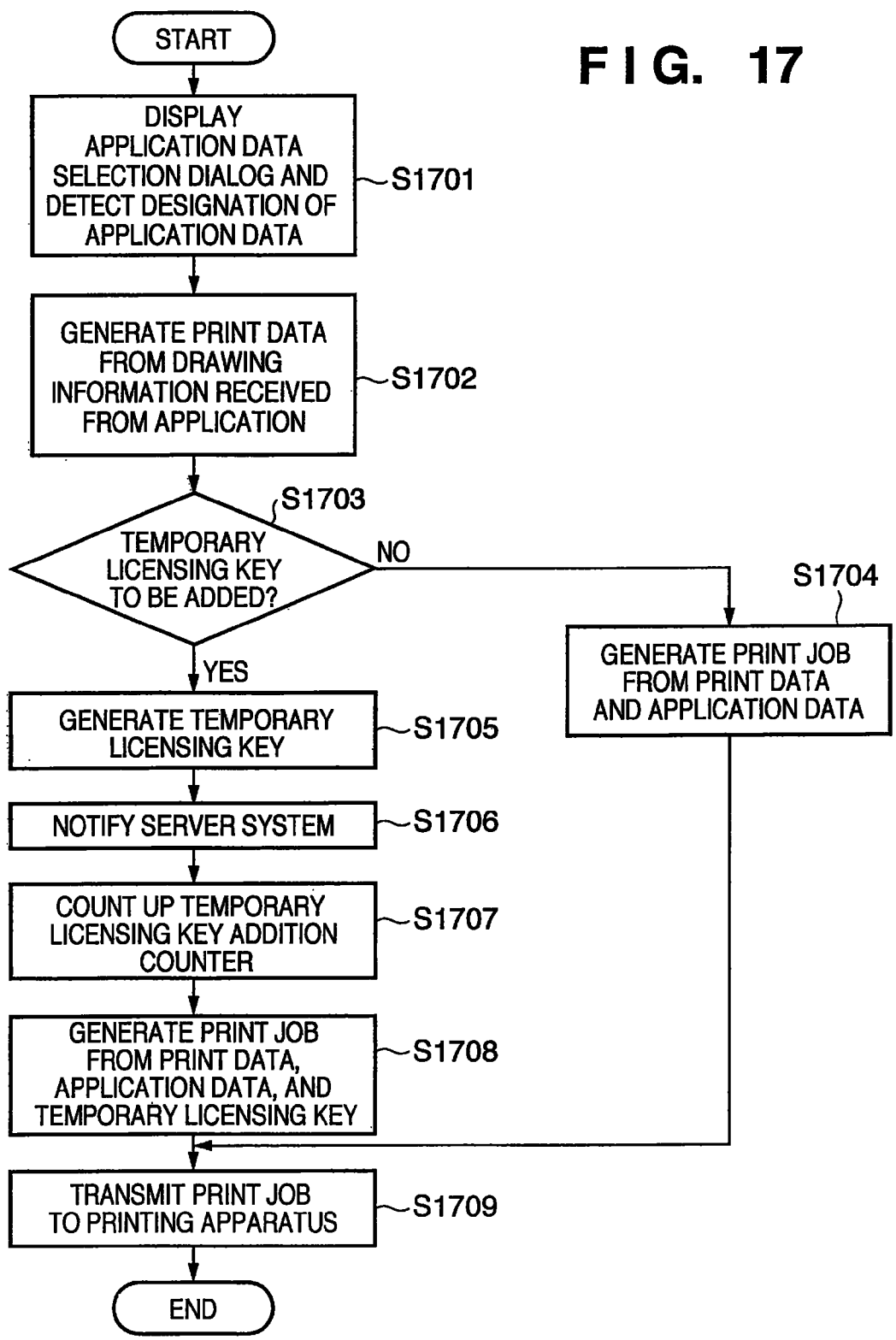
FIG. 17 is a flowchart illustrating the process executed by a host computer and server system of the third embodiment of the present invention.

<Description of FIG. 17>

FIG. 17 is a flowchart illustrating the process executed by the host computer and server system of the third embodiment of the present invention.

FIG. 17 illustrates the process executed by the printer driver 103 and server system 1601 executed when a user obtains a print result with application data printed.

The printer driver 103 displays an application data selection dialog 901 and detects user's designation of application data and presence/absence of temporary licensing key addition (step S1701). After that, the printer driver 103 receives drawing information from an application 102 and generates print data which can be printed by the printing apparatus 120 (step S1702).

The printer driver 103 determines whether designation to add a temporary licensing key is made (step S1703). When no designation to add a temporary licensing key is made (NO is step S1703), the printer driver 103 generates a print job from the designated application data and generated print data (step S1704). The printer driver 103 then transmits the generated print job to the printing apparatus 120 (step S1709), and a sequence of the process is ended.

On the other hand, when the designation to add a temporary licensing key is made (YES in step S1703), the temporary licensing key generation unit 801 generates a temporary licensing key (step S1705).

In the third embodiment, in order to prevent the abuse of the temporary licensing keys, the temporary licensing key generation unit 801 generates a temporary licensing key which corresponds one-to-one with the designated application. More specifically, the checksum value (validity confirmation information) of application data can be used as an attribute of a temporary licensing key.

The server notification unit 1602 notifies the server system 1601 of the generation of the temporary licensing key (step S1706). Information given by the server notification unit 1602 notifies the count value, such as print counts, corresponding to the generation amount of temporary licensing keys.

The server system 1601 counts up the temporary licensing key addition charging counter 1603 by the notified counts (step S1707). The printer driver 103 then generates a print job from the designated application data, generated print data, and generated temporary licensing key (step S1708). After that, the printer driver 103 transmits the print job to the printing apparatus 120, and a sequence of the process is ended.

Figure 18:
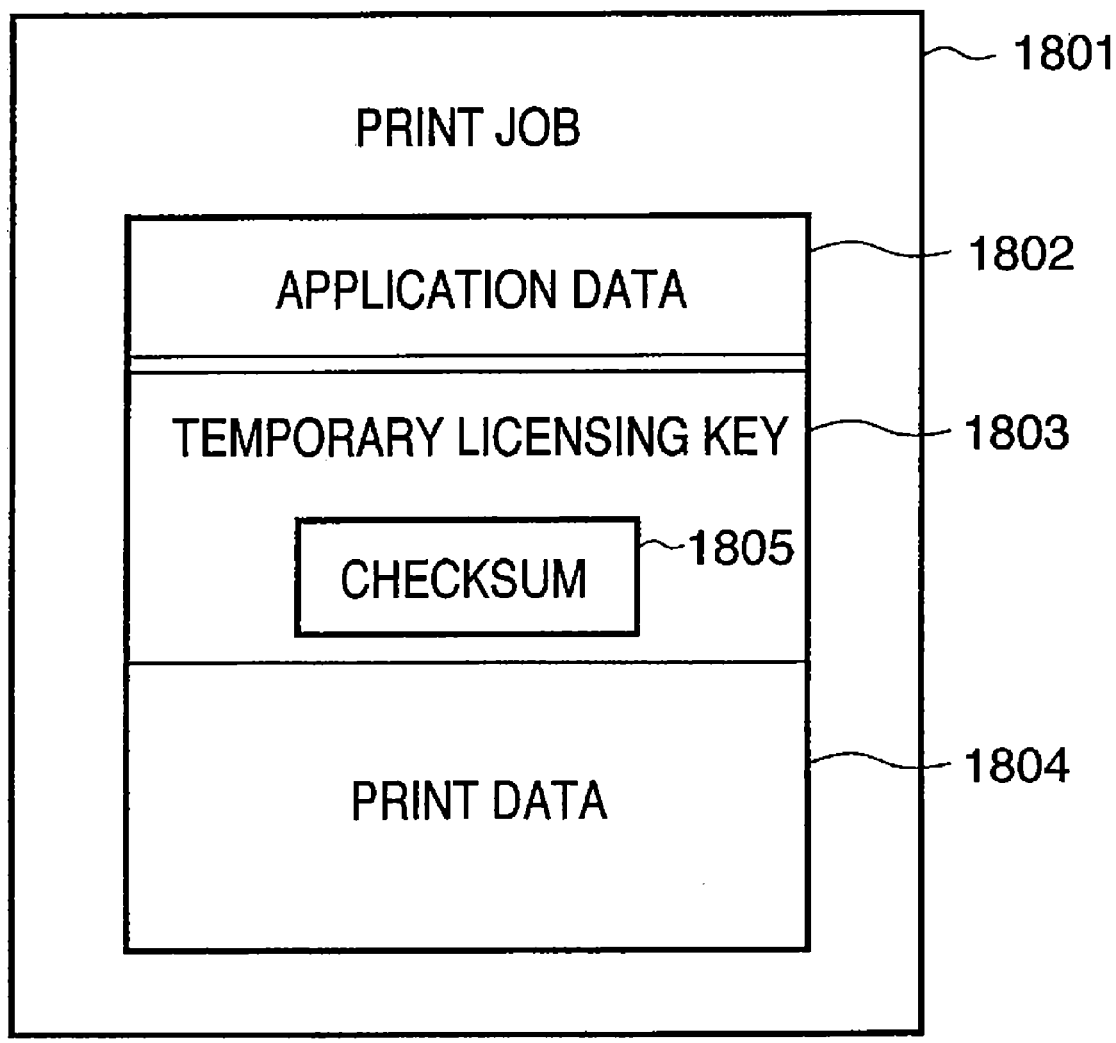
FIG. 18 is a view illustrating the form of a print job generated in step S1708 of the third embodiment of the present invention.

<Description of FIG. 18>

FIG. 18 is a view illustrating the form of a print job generated in step S1708 of the third embodiment of the present invention.

Reference numeral 1801 denotes the whole print job. Reference numeral 1802 denotes the application data selected by the user in step S1701 of FIG. 17; and 1803, a temporary licensing key generated by the printer driver 103 in step S1705 of FIG. 17. Reference numeral 1804 denotes the print data generated by the printer driver 103 in step S1702 of FIG. 17. The print job 1801 is generally formed to include the application data 1802, temporary licensing key 1803, and print data 1804.

The print data 1804 is described in, e.g., a page description language (to be referred to as PDL hereinafter). The temporary licensing key 1803 includes, as its attribute information, a checksum value 1805 of the application data 1802. With the checksum value 1805, it becomes possible to determine that the application data 1802 corresponds to the temporary licensing key 1803.

In the third embodiment, the process executed when the printing apparatus 120 receives a print job is the same (description of FIG. 12) as in the second embodiment, and a description thereof will not be repeated. The arrangement of an application data-printed printing sheet output from the printing system is the same as in the second embodiment, and a description thereof will not be repeated.

Figure 19:
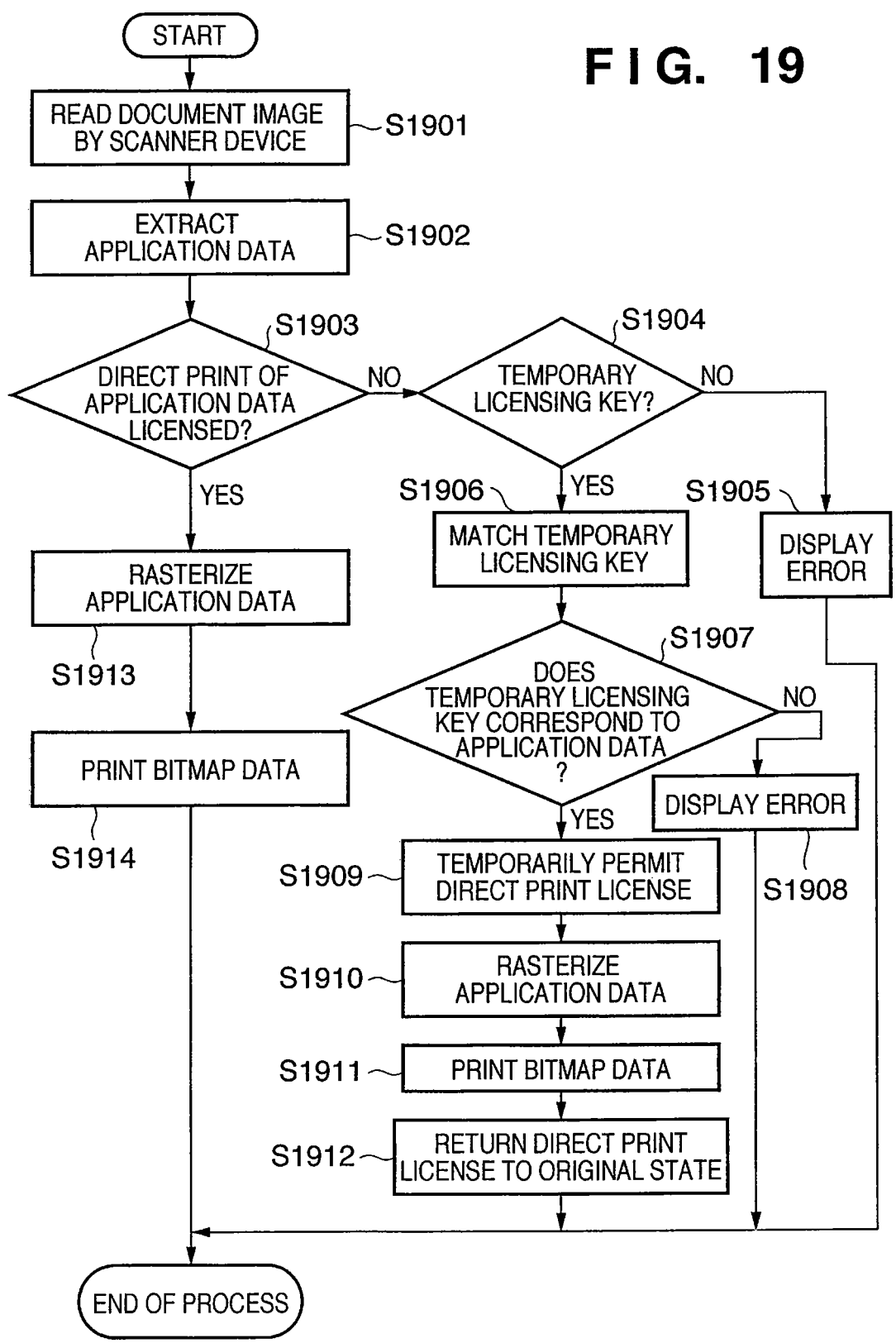
FIG. 19 is a flowchart illustrating the process executed by a printing apparatus of the third embodiment of the present invention.

<Description of FIG. 19>

FIG. 19 is a flowchart illustrating the process executed by the printing apparatus of the third embodiment of the present invention.

FIG. 19 illustrates the process of the printing apparatus 120 executed when a user uses a printing sheet with application data printed to print the application data.

First, a scanner device 126 reads image data printed on a document image (step S1901). A digital data extraction unit 127 extracts application data from the read image data (step S1902).

A license management unit 803 determines whether a license to direct-print the extracted application by the printing apparatus 120 is permitted (step S1903).

When the license for the direct print is not permitted (NO in step S1903), the temporary licensing key extraction unit 802 determines whether a temporary licensing key is recorded in the read image data (step S1904). When no temporary licensing key is recorded (NO in step S1904), an error notification window is displayed (step S1905) and a sequence of the process is ended.

On the other hand, when the temporary licensing key is recorded (YES in step S1904), the temporary licensing key matching unit 1604 determines whether the extracted temporary licensing key corresponds to the extracted application data (step S1906). When the temporary licensing key does not correspond to the application data (NO is step S1907), an error notification window is displayed (step S1908), and a sequence of the process is ended.

When YES in step S1907, the license management unit 803 temporarily permits the license to direct-print the application data (step S1909). An application data extraction unit 128 directly interprets the extracted application data and rasterizes it into bitmap data (step S1910).

The printing apparatus 120 then transmits the rasterized bitmap data to a printer engine 125 to execute printing (step S1911). After that, the license management unit 803 returns the license which was temporarily permitted to the original state (prohibition of direct print) (step S1912), and a sequence of the printing process is ended.

On the other hand, when the license to direct-print the application data is permitted (YES in step S1903), the application data rasterization unit 128 directly interprets the extracted application data and rasterizes it into bitmap data (step S1913). The printing apparatus 120 then transmits the rasterized bitmap data to the printer engine 125 to execute printing (step S1914), and a sequence of the printing process is ended.

Note that the error notification window displayed in step S1905 is the same as in the second embodiment, and a description thereof will not be repeated.

Figure 20:
FIG. 20 is a view illustrating an example of an error notification window displayed in step S1908 of the third embodiment of the present invention.

<Description of FIG. 20>

FIG. 20 is a view illustrating an example of the error notification window displayed in step S1908 of the third embodiment of the present invention.

The error notification window is displayed on, e.g., an operation panel (not shown) included in the printing apparatus 120 or a screen of the host computer 101.

As has been described above, according to the third embodiment, a printing system can be provided in which a user who indicates printing including a temporary licensing key is charged upon generating a printing sheet with the temporary licensing key added. In addition, a more secured system can be provided since printing will not be executed unless the temporary licensing key corresponds to the application data.

Fourth Embodiment

In the above-described embodiments, application data and a temporary licensing key are designated on the host computer. However, they may be designated from an operation panel included in a printing apparatus.

In the above-described embodiments, a temporary licensing key is generated by the printer driver on the host computer. However, a temporary licensing key may be purchased by downloading it from an external device.

In the above-embodiment, a temporary licensing key is generated by the printer driver on the host computer. However, a temporary licensing key printed on a printing sheet in advance may be sold or distributed.

In the above-described embodiment, the use count of a temporary licensing key is not limited. However, the use amount of a temporary licensing key may be limited by setting use count limit information to the individual temporary licensing key on the printing apparatus side.

An arbitrary charging target may be selected by designating a charging target upon adding a temporary licensing key.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-169386 filed on Jun. 19, 2006, which is hereby incorporated by reference herein in its entirety.

What is claimed is:

1. A printing apparatus, comprising:
a reading unit adapted to read a document image;
an extraction unit adapted to extract application data from the document image read by said reading unit;
a first determination unit adapted to determine whether a license to direct-print the application data extracted by said extraction unit is permitted;
a second determination unit adapted to determine, if it is determined by said first determination unit that a license to direct-print the application data extracted by said extraction unit is not permitted, whether a temporary licensing key is recorded in the document image read by said reading unit; and
a processing unit is adapted to,
  a) if it is determined by said first determination unit that a license to direct-print the application data extracted by said extraction unit is permitted, analyze the application data extracted by said extraction unit and generate bitmap data,
  b) if it is determined by said second determination unit that the temporary licensing key is recorded in the document image read by said reading unit, temporarily permit a license to direct-print, analyze the application data extracted by said extraction unit, generate bitmap data, print the bitmap data and return the temporarily permitted license to direct-print to original state.

2. The apparatus according to claim 1, wherein the processing unit,
  if it is determined by the first determination unit that a license to direct-print the application data extracted by said extraction unit is permitted, analyzes the application data extracted by said extraction unit, generates bitmap data, and counts up a charging counter;
  if it is determined by the second determination unit that the temporary licensing key is recorded in the document image read by said reading unit, temporally permits a license to direct-print, analyzes the application data extracted by said extraction unit, generates bitmap data, prints the bitmap data, counts up a licensing charging counter, and returns the temporarily permitted license to direct-print to original state; and
  if it is determined by the second determination unit that the temporary licensing key is not recorded in the document image read by said reading unit, displays an error notification window.

3. A control method for printing apparatus, comprising, a reading step of reading a document image;

an extraction step of extracting application data from the document image read in said reading step;

a first determination step of determining whether a license to direct-print the application data extracted in said extraction step is permitted;

a second determination step of determining, if it is determined in said first determination step that a license to direct-print the application data extracted in said extraction step is not permitted, whether a temporary licensing key is recorded in the document image read in said reading step; and a processing step of,
- a) if it is determined in said first determination step that a license to direct-print the application data extracted in said extraction step is permitted, analyzing the application data extracted in said extraction step and generating bitmap data,
- b) if it is determined in said second determination step that the temporary licensing key is recorded in the document image read in said reading step, temporarily permitting a license to direct-print, analyzing the application data extracted in said extraction step, generating bitmap data, print the bitmap data and returning the temporarily permitted license to direct-print to original state.

4. The method according to claim 3, wherein the processing step, if it is determined in the first determination step that a license to direct-print the application data in said extraction step is permitted, analyzes the application data extracted in said extraction step, generates bitmap data, counts up a charging counter;

if it is determined in the second determination step that the temporary licensing key is recorded in the document image read in said reading step, temporally permits a license to direct-print, analyzes the application data extracted in said extraction step, generates bitmap data, prints the bitmap, counts up a licensing charging counter, and returns the temporarily permitted license to direct-print to original state; and if it is determined in the second determination step that the temporary licensing key is not recorded in the document image read in said reading step, displays an error notification window.

\* \* \* \* \*